US007716648B2

(12) United States Patent
Vaidyanathan et al.

(10) Patent No.: US 7,716,648 B2
(45) Date of Patent: May 11, 2010

(54) METHOD AND APPARATUS FOR DETECTING MEMORY LEAKS IN COMPUTER SYSTEMS

(75) Inventors: Kalyanaraman Vaidyanathan, San Diego, CA (US); Sajjit Thampy, La Jolla, CA (US); Kenny C. Gross, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 1317 days.

(21) Appl. No.: 11/195,015

(22) Filed: Aug. 2, 2005

(65) Prior Publication Data

US 2007/0033365 A1 Feb. 8, 2007

(51) Int. Cl.
*G06F 9/44* (2006.01)
(52) U.S. Cl. ...................................... 717/128
(58) Field of Classification Search .................. 717/128
See application file for complete search history.

(56) References Cited

U.S. PATENT DOCUMENTS

| 4,937,763 | A | 6/1990 | Mott ........................... 364/550 |
| 6,629,266 | B1 * | 9/2003 | Harper et al. ................. 714/38 |
| 7,496,795 | B2 * | 2/2009 | Minshall et al. ............... 714/38 |
| 2004/0088338 | A1 | 5/2004 | Garthwaite |
| 2004/0111448 | A1 | 6/2004 | Garthwaite |
| 2004/0111449 | A1 | 6/2004 | Garthwaite |
| 2004/0172579 | A1 | 9/2004 | Fu |
| 2005/0076184 | A1 | 4/2005 | Schumacher |
| 2005/0235054 | A1 * | 10/2005 | Kadashevich ............... 709/223 |

OTHER PUBLICATIONS

J. Stuart Hunter, "The Exponentially Weighted Moving Average", Journal of Quality Technology, vol. 18, No. 4, Oct. 1986, XP009089276, pp. 203-210.
Norma Faris Hubele et al., "Adaptive Exponentially Weighted Moving Average Schemes Using a Kalman Filter", IIE Transactions, Dec. 1990, XP009040892, pp. 361-369.
Sachin Garg et al., "A Methodology for Detection and Estimation of Software Aging", 1998 IEEE, pp. 283-292.

* cited by examiner

*Primary Examiner*—Ted T Vo
*Assistant Examiner*—Junchun Wu
(74) *Attorney, Agent, or Firm*—Park, Vaughan & Fleming LLP

(57) ABSTRACT

A system that identifies processes with a memory leak in a computer system. During operation, the system periodically samples memory usage for processes running on the computer system. The system then ranks the processes by memory usage and selects a specified number of processes with highest memory usage based on the ranking. For each selected process, the system computes a first-order difference of memory usage by taking a difference between the memory usage at a current sampling time and the memory usage at an immediately preceding sampling time. The system then generates a memory-leak index based on the first-order difference and a preceding memory-leak index computed at the immediately preceding sampling time.

19 Claims, 4 Drawing Sheets

METHOD AND APPARATUS FOR DETECTING MEMORY LEAKS IN COMPUTER SYSTEMS

BACKGROUND

1. Field of the Invention

The present invention relates to techniques for detecting memory leaks in computer systems. More specifically, the present invention relates to a method and apparatus for detecting memory leaks by observing the historical memory-usage of processes in a computer system.

2. Related Art

Memory leaks can adversely affect computer system performance and can significantly decrease software reliability. Moreover, memory leaks can remain in programs despite extensive testing during the development phase and despite the use of garbage collection techniques during runtime. Long-running programs with memory leaks and programs that allocate memory extensively can consume enough resources in a computer system to seriously hinder performance, or even worse to cause application or system crashes. This problem is more acute in a multi-user environment, where a large numbers of users can be affected by a single application or a single process which has a memory leak. If applications or processes with memory leaks are detected in advance, preventive actions can be taken to avoid serious problems affecting many users.

Many programming languages provide mechanisms for explicit dynamic allocation and deallocation of memory during program execution. After using a dynamically allocated object, if there is no more need for it, the memory consumed by the object should be explicitly released. Failure to release the memory consumed by the object can cause a memory leak.

Memory leaks are common in programming languages such as C and C++, which rely heavily on pointer arithmetic and which do not provide a garbage-collection mechanism.

However, garbage collection does not necessarily prevent memory leaks from occurring. Note that a garbage collection mechanism cleans up objects only if there are no references to the objects. Consequently, memory leaks can occur in a garbage-collected system if applications continually generate a large number of referenced objects which eventually become unused but remain referenced.

A memory leak causes the computer system as a whole, not merely the erroneous process, to use an ever growing amount of memory. Eventually, much (or all) of the available memory will be allocated (and not freed), thereby causing the entire system to become severely degraded or to crash.

System administrators typically do not get a warning that there is a problem until 95%-98% of the available memory has been used up. At this point, the system administrator typically identifies processes consuming the largest amounts of memory, and then terminates these processes in an effort to prevent a system crash. However, the terminated processes may not be the ones that actually have a memory leak; they may simply be processes that use a lot of memory. Moreover, well before the system administrator starts taking remedial actions, individual user processes may request more memory than is available, which can cause processes to swap to disk, thereby greatly decreasing performance of the process.

Tools are available for debugging programs and for detecting memory leaks when the source code is available. However, these tools cannot be used when the source code is not available; for example, when third-party and off-the-shelf software is used.

Another technique to detect memory leaks involves detecting gradual resource exhaustion in computer systems. This technique uses time-series analysis to detect trends in resource usage and to estimate the time until resource exhaustion. Preventive actions, such as software rejuvenation operations, can be taken to avoid any impending failure. The drawback of this technique is that it does not pinpoint the offending process, and hence, the entire system may have to be rebooted. Furthermore, this technique provides no feedback to facilitate root-cause analysis. Another drawback is that subtle memory leaks cannot be detected when the memory usage is large and "noisy," which commonly occurs in multi-user server systems.

Hence, what is needed is a method and an apparatus for detecting the onset of memory leaks in computer systems without the problems described above.

SUMMARY

One embodiment of the present invention provides a system that identifies processes with a memory leak in a computer system. During operation, the system periodically samples memory usage for processes running on the computer system. The system then ranks the processes by memory usage and selects a specified number of processes with highest memory usage based on the ranking. For each selected process, the system computes a first-order difference of memory usage by taking a difference between the memory usage at a current sampling time and the memory usage at an immediately preceding sampling time. The system then generates a memory-leak index based on the first-order difference and a preceding memory-leak index computed at the immediately preceding sampling time.

In a variation on this embodiment, the system sorts the processes by decreasing order of memory-leak index and reports a specified number of top processes with non-negative memory-leak indexes.

In a variation on this embodiment, before generating the memory-leak index, the system waits until the selected process is past an initial blackout period. Note that the selected process is past the initial blackout period if a minimum runtime for the process has elapsed, and if a minimum number of memory usage samples have been taken.

In a variation on this embodiment, while generating the memory-leak index, the system applies an exponential forgetting function to the first-order difference and the preceding memory-leak index.

In a further variation on this embodiment, a parameter is used to specify the extent to which the exponential forgetting function discards past memory usage values.

In yet a further variation on this embodiment, a larger value for the parameter causes the exponential forgetting function to discard past memory usage values more quickly. Similarly, a smaller value for the parameter causes the exponential forgetting function to discard past memory usage values more slowly.

In a variation on this embodiment, the memory-leak index is proportional to the magnitude of the memory leak. Note that a process with a high memory-leak index indicates that the process is likely to suffer from memory leaks.

DETAILED DESCRIPTION

Figure 1:
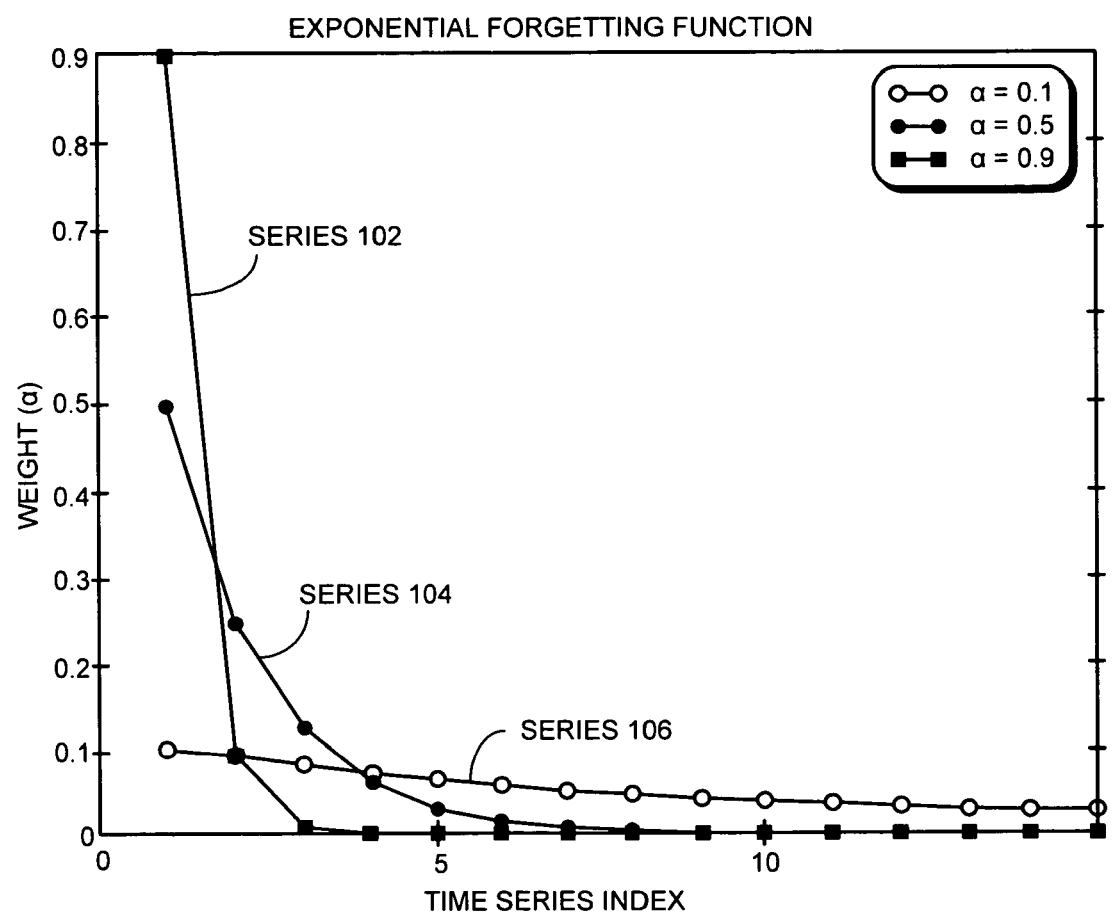
FIG. 1 illustrates the behavior of an exponential forgetting function in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Exponential Forgetting Function

The present invention uses a proactive pattern recognition technique for monitoring memory-related telemetry metrics on a computer system and for detecting subtle memory leaks in processes while avoiding false alarms. The present invention also uses very little storage and CPU resources. Furthermore, the present invention is useful for the management of multi-user servers and can aid in root-cause analysis of memory leak problems.

The present invention uses a pattern recognition technique that reliably picks out individual processes that have a memory leak from among hundreds or thousands of other normal processes running on a computer system. In doing so, the present invention applies an "exponential forgetting function" to the historical behavior of the processes. This exponential forgetting function provides an optimal tradeoff between high sensitivity for detecting subtle memory leaks and good avoidance of false alarms (so that system administrators are not distracted by alarms for normal processes). During operation, the present invention assigns a quantitative risk index called the "memory-leak index" (MLI), which is directly proportional to the magnitude of the memory leak, to all processes running on the server.

One embodiment of the present invention operates as follows:

Step 1: The system ranks and sorts the memory-usage statistics for all processes on the server based on total memory usage. The system then samples the memory usage at regular intervals. This creates a table of time series observations with columns representing processes and rows representing discrete observations of memory usage for all processes. (Note that columns can disappear and new columns can appear as processes expire and new processes are spawned.)

Step 2: After each time sample (except the first sample for a process), the system computes a first-order difference in the memory usage time-series. Note that this first-order difference represents a discrete approximation to the first time derivative for every process.

Step 3: After an initial "blackout period" of x samples for each process, the system applies an exponential forgetting function to filter the array of discrete differences for each process. (Note that the purpose for the blackout period is to ignore processes that perform all of their allocation activities immediately after launching.) The exponential forgetting function operates on the sample differences and generates a memory leak index (MLI) for each process. The system then displays the processes which have a non-negative MLIs in a table sorted by decreasing order of their MLIs. Processes that have a high MLI appear at the top of this table and are most likely to suffer from memory leaks.

The exponential forgetting function operates as follows:

Let $y_1, y_2, y_3, \ldots, y_n$ be n observations over time. Note that the subscripts refer to the time periods, $1, 2, \ldots, n$.

Let $S_2, S_3, \ldots S_n$, be the estimates generated by the function. Note that since the estimates start only with the second observation, there is no $S_1$.

The system generates estimates by first setting $S_2 = y_1$. The system computes the subsequent estimates using the following formula:

$$S_t = \alpha y_{t-1} + (1-\alpha)S_{t-1}, \quad t \geq 3$$

where $0 \leq \alpha \leq 1$

Expanding the equations results in the following relationship:

$$S_t = \alpha \sum_{i=1}^{t-1} (1-\alpha)^{i-1} y_{t-i} + (1+\alpha)^{t-2} S_2, \quad \text{where } t \geq 2$$

Therefore, the weights of the y terms, $\alpha(1-\alpha)^t$, decrease geometrically with each time period and the sum of all the weights is unity. In other words, $$\alpha \sum_{i=1}^{t-1} (1-\alpha)^i + (1+\alpha)^t = 1.$$

FIG. 1 illustrates the behavior of the exponential forgetting function in accordance with an embodiment of the present invention. It illustrates time series 102, 104, and 106 where α is set to 0.9, 0.5, and 0.1, respectively.

In one embodiment of the present invention, the extent to which how quickly and how slowly the exponential forgetting function forgets the past values is controlled by the α parameter. The larger the value of this parameter, the sooner the exponential forgetting function forgets the past values, and vice-versa.

Figure 2A:
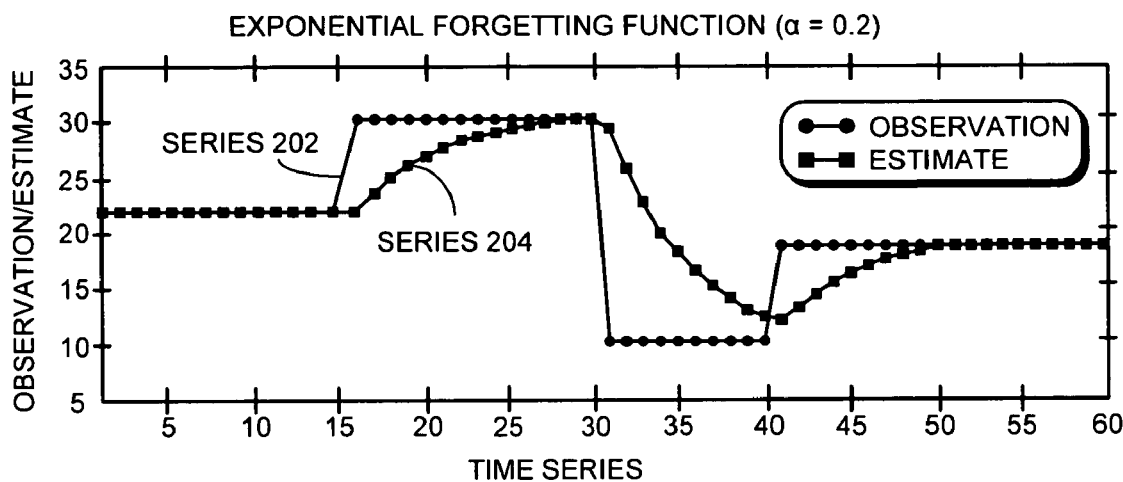
FIG. 2A illustrates the effect of a using small value for a in accordance with an embodiment of the present invention.

FIG. 2A illustrates the effect of a using small value for α in accordance with an embodiment of the present invention. Series 202 is the observed memory usage as a function of time. Series 204 is the estimated memory usage after applying the exponential forgetting function. In this example, α=0.2.

Figure 2B:
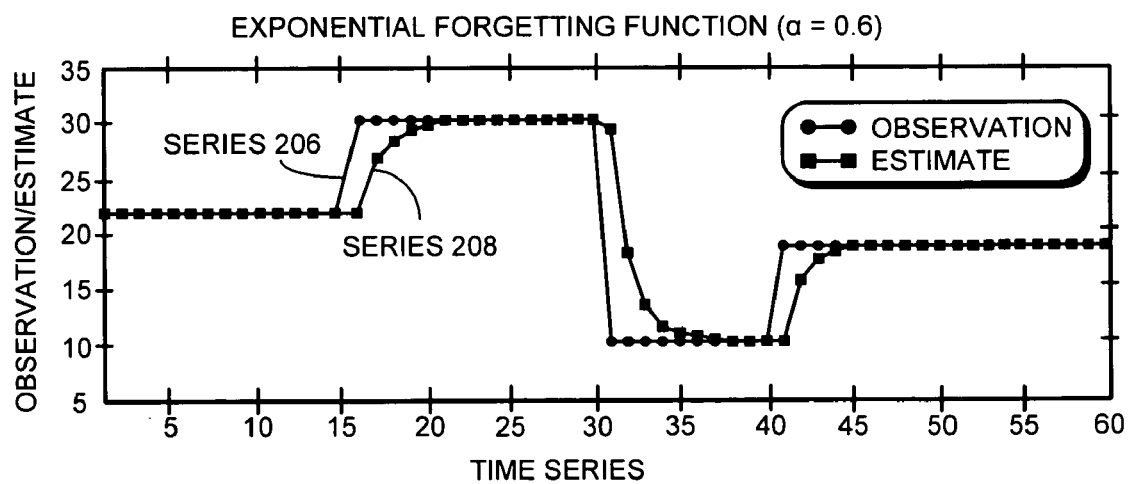
FIG. 2B illustrates the effect of a using large value for a in accordance with an embodiment of the present invention.

FIG. 2B illustrates the effect of a using large value for a in accordance with an embodiment of the present invention. Series 206 is the observed memory usage as a function of time. Series 208 is the estimated memory usage after applying the exponential forgetting function. In this example, α=0.6.

Figure 3A:
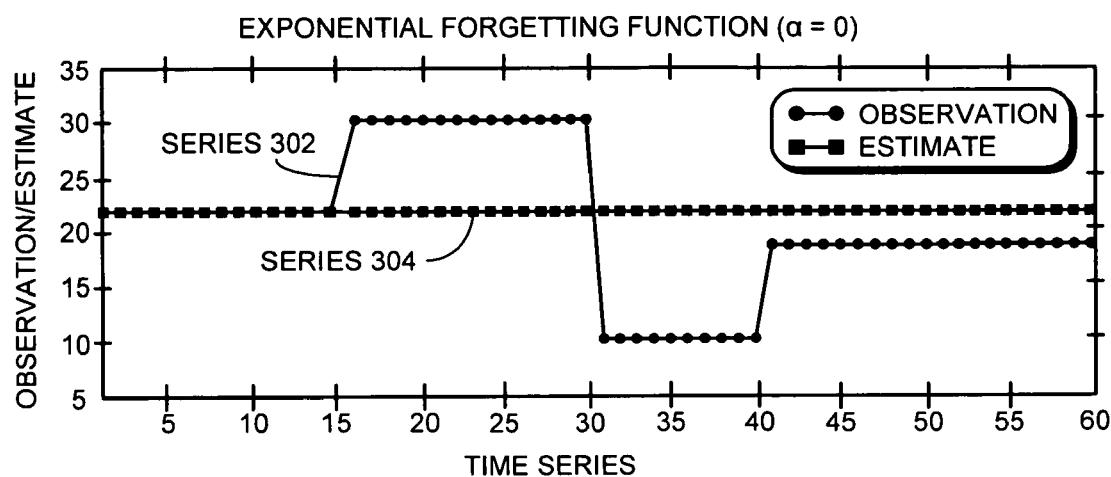
FIG. 3A illustrates the effect of setting a to zero in accordance with an embodiment of the present invention.

FIG. 3A illustrates the effect of setting a to zero in accordance with an embodiment of the present invention. Series 302 is the observed memory usage as a function of time. Series 304 is a flat line because only the very first value is retained (i.e. the function remembers everything).

Figure 3B:
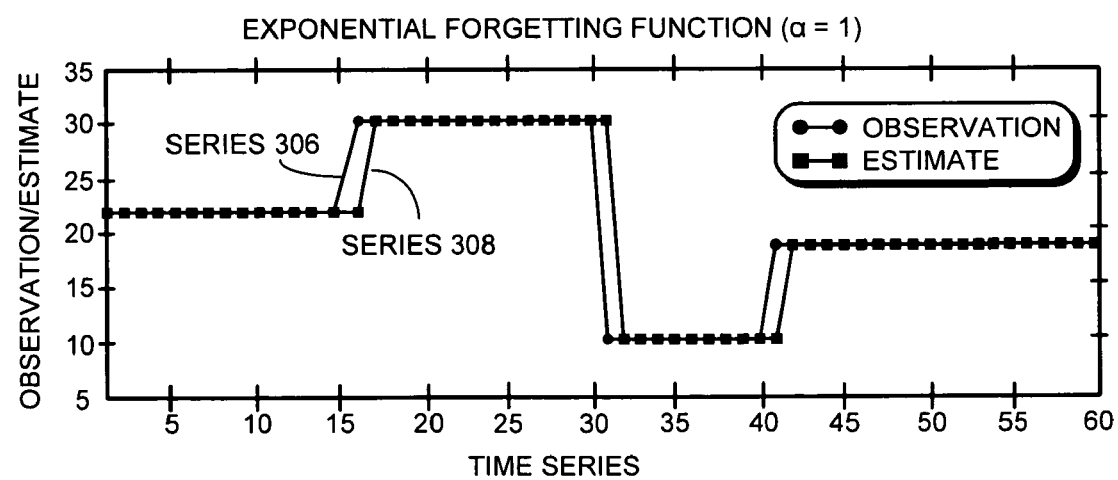
FIG. 3B illustrates the effect of setting a to one in accordance with an embodiment of the present invention.

FIG. 3B illustrates the effect of setting a to one in accordance with an embodiment of the present invention. Series 306 is the observed memory usage as a function of time. Series 308 tracks series 306 because only the current value is retained (i.e. the function forgets everything).

In one embodiment of the present invention, the values $y_1$, $y_2$, $y_3$, ..., $y_n$ are differences in the memory usage (i.e. increase or decrease in memory), not absolute memory usage values. The advantage of this technique is that past sample values are not stored. The system only uses the last value and the last MLI to compute the next MLI. Hence, the storage overhead is extremely small. The CPU overhead is also insignificant since the system only keeps track of the top N processes sorted by memory usage. Furthermore, the computational effort for the MLI for each process is trivial.

Detecting a Memory Leak

Figure 4:
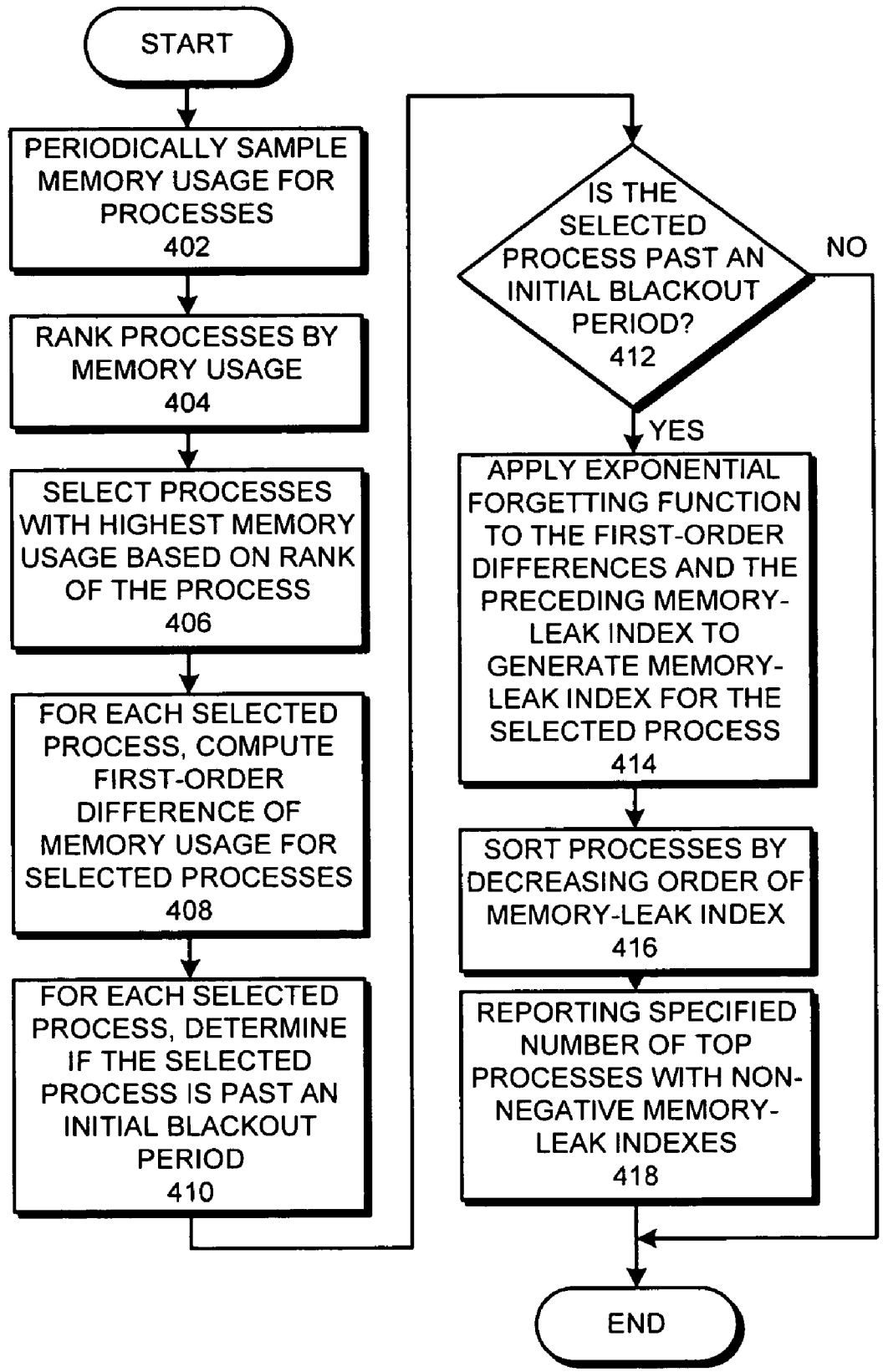
FIG. 4 presents a flow chart illustrating the process of identifying processes with a memory leak in a computer system in accordance with an embodiment of the present invention.

FIG. 4 presents a flow chart illustrating the process of identifying processes with a memory leak in a computer system in accordance with an embodiment of the present invention. The process begins when the system periodically samples memory usage for processes in the computer system (step 402). Next, the system ranks the processes by memory usage (step 404) and selects a specified number of processes with highest memory usage based on the ranking (step 406).

For each selected process, the system computes the first-order difference of memory usage by taking a difference between the memory usage at a current sampling time and the memory usage at an immediately preceding sampling time (step 408). The system then determines if the selected process is past an initial blackout period (steps 410 and 412). If so, the system applies an exponential forgetting function to the first-order difference and a preceding memory-leak index computed at the immediately preceding sampling time to generate a memory-leak index for the selected process (step 414). Note that the selected process is past the initial blackout period if a minimum run-time for the process has elapsed, and if a minimum number of memory usage samples have been taken.

Note that the system can use a parameter to specify the extent to which the exponential forgetting function discards past memory usage values. A larger value for the parameter causes the exponential forgetting function to discard past memory usage values more quickly, and a smaller value for the parameter causes the exponential forgetting function to discard past memory usage values more slowly.

Also note that the memory-leak index is proportional to the magnitude of the memory leak. Consequently, a process with a high memory-leak index indicates that the process is likely to suffer from memory leaks.

Next, the system sorts the processes by decreasing order of memory-leak index (step 416) and reports a specified number of top processes with non-negative memory-leak indexes (step 418).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for identifying processes with a memory leak in a computer system, comprising:
   for each process that is being monitored,
      computing a first-order difference of memory usage by taking a difference between the memory usage at a current sampling time and the memory usage at an immediately preceding sampling time; and
      generating a memory-leak index based on the first-order difference and historical memory-usage information, wherein generating the memory-leak index involves waiting until the process is past an initial blackout period, wherein the process is past the initial blackout period if a minimum run-time for the process has elapsed, and if a minimum number of memory usage samples have been taken.

2. The method of claim 1, wherein prior to monitoring memory usage, the method further comprises selecting processes to be monitored by:
   periodically sampling memory usage for processes running on the computer system;
   ranking the processes by memory usage; and
   selecting for monitoring a specified number of processes with highest memory usage based on the ranking.

3. The method of claim 1, wherein the historical memory-usage information includes a preceding memory-leak index computed at the immediately preceding sampling time.

4. The method of claim 1, wherein the method further comprises:
   sorting the processes by decreasing order of memory-leak index; and
   reporting a specified number of top processes with non-negative memory-leak indexes.

5. The method of claim 1, wherein generating the memory-leak index involves applying an exponential forgetting function to the first-order difference and the memory-leak index.

6. The method of claim 5, wherein a parameter is used to specify the extent to which the exponential forgetting function discards past memory usage values.

7. The method of claim 6,
   wherein a larger value for the parameter causes the exponential forgetting function to discard past memory usage values more quickly; and
   wherein a smaller value for the parameter causes the exponential forgetting function to discard past memory usage values more slowly.

8. The method of claim 1,
   wherein the memory-leak index is proportional to the magnitude of the memory leak; and
   wherein a process with a high memory-leak index indicates that the process is likely to suffer from memory leaks.

9. An apparatus for identifying processes with a memory leak in a computer system, comprising:
   a memory; and
   a memory-leak detection mechanism;
   wherein the memory-leak detection mechanism is configured to:
      for each process that is being monitored, to
         compute a first-order difference of memory usage by taking a difference between the memory usage at a current sampling time and the memory usage at an immediately preceding sampling time; and to generate a memory-leak index based on the first-order difference and historical memory-usage information, wherein generating the memory-leak index involves waiting until the process is past an initial blackout period, wherein the process is past the initial blackout period if a minimum run-time for the process has elapsed, and if a minimum number of memory usage samples have been take.

10. The apparatus of claim 9, wherein prior to monitoring memory usage, to select processes to be monitored, the memory-leak detection mechanism is configured to:
    periodically sample memory usage for processes running on the computer system;
    rank the processes by memory usage; and
    select for monitoring a specified number of processes with highest memory usage based on the ranking.

11. The method of claim 9, wherein the historical memory-usage information includes a preceding memory-leak index computed at the immediately preceding sampling time.

12. The apparatus of claim 9, wherein the memory-leak detection mechanism is additionally configured to:
    sort the processes by decreasing order of memory-leak index; and to
    report a specified number of top processes with non-negative memory-leak indexes.

13. The apparatus of claim 9, wherein while generating the memory-leak index, the memory-leak detection mechanism is configured to apply an exponential forgetting function to the first-order difference and the memory-leak index.

14. The apparatus of claim 13, wherein a parameter is used to specify the extent to which the exponential forgetting function discards past memory usage values.

15. The apparatus of claim 14,
    wherein a larger value for the parameter causes the exponential forgetting function to discard past memory usage values more quickly; and
    wherein a smaller value for the parameter causes the exponential forgetting function to discard past memory usage values more slowly.

16. The apparatus of claim 9,
    wherein the memory-leak index is proportional to the magnitude of the memory leak; and
    wherein a process with a high memory-leak index indicates that the process is likely to suffer from memory leaks.

17. A computer system for identifying processes with a memory leak, comprising:
    a memory; and
    a memory-leak detection mechanism;
    wherein the memory-leak detection mechanism is configured to:
        for each process that is being monitored, to
            compute a first-order difference of memory usage by taking a difference between the memory usage at a current sampling time and the memory usage at an immediately preceding sampling time; and to
            generate a memory-leak index based on the first-order difference and historical memory-usage information, wherein generating the memory-leak index involves waiting until the process is past an initial blackout period, wherein the process is past the initial blackout period if a minimum run-time for the process has elapsed, and if a minimum number of memory usage samples have been taken.

18. The computer system of claim 17, wherein prior to monitoring memory usage, to select processes to be monitored, the memory-leak detection mechanism is configured to:
    periodically sample memory usage for processes running on the computer system;
    rank the processes by memory usage; and
    select for monitoring a specified number of processes with highest memory usage based on the ranking.

19. The computer system of claim 17, wherein the historical memory-usage information includes a preceding memory-leak index computed at the immediately preceding sampling time.

* * * * *

UNITED STATES PATENT AND TRADEMARK OFFICE
CERTIFICATE OF CORRECTION

| | | |
|---|---|---|
| PATENT NO. | : 7,716,648 B2 | Page 1 of 1 |
| APPLICATION NO. | : 11/195015 | |
| DATED | : May 11, 2010 | |
| INVENTOR(S) | : Kalyanaraman Vaidyanathan et al. | |

It is certified that error appears in the above-identified patent and that said Letters Patent is hereby corrected as shown below:

In column 3, line 1, delete "for a" and insert -- for $\alpha$ --, therefor.

In column 3, line 3, delete "for a" and insert -- for $\alpha$ --, therefor.

In column 3, line 5, delete "a to" and insert -- $\alpha$ to --, therefor.

In column 3, line 7, delete "a to" and insert -- $\alpha$ to --, therefor.

In column 5, line 1, delete "a in" and insert -- $\alpha$ in --, therefor.

In column 5, line 6, delete "a to" and insert -- $\alpha$ to --, therefor.

In column 5, line 11, delete "a to" and insert -- $\alpha$ to --, therefor.

Signed and Sealed this
Fourteenth Day of June, 2011

David J. Kappos
*Director of the United States Patent and Trademark Office*